United States Patent
Penzo et al.

(10) Patent No.: US 9,809,659 B2
(45) Date of Patent: Nov. 7, 2017

(54) ETHYLENE POLYMERIZATION PROCESS HAVING IMPROVED HEAT EXCHANGER PERFORMANCE

(71) Applicant: Basell Polyolefine GmbH, Wesseling (DE)

(72) Inventors: Giuseppe Penzo, Ferrara (IT); Rodrigo Carvajal, Bonn (DE); Reinhard Kuehl, Bornheim (DE); Elke Damm, Bad Vilbel (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/321,152

(22) PCT Filed: Jun. 22, 2015

(86) PCT No.: PCT/EP2015/063996
§ 371 (c)(1),
(2) Date: Dec. 21, 2016

(87) PCT Pub. No.: WO2015/197561
PCT Pub. Date: Dec. 30, 2015

(65) Prior Publication Data
US 2017/0204206 A1 Jul. 20, 2017

(30) Foreign Application Priority Data
Jun. 25, 2014 (EP) .................................. 14173958

(51) Int. Cl.
*C08F 10/02* (2006.01)
*C08F 2/01* (2006.01)
(Continued)

(52) U.S. Cl.
CPC ................ *C08F 10/02* (2013.01); *C08F 2/01* (2013.01); *C08F 2/12* (2013.01); *C08F 2/18* (2013.01)

(58) Field of Classification Search
CPC ....... C08F 2/14; C08F 10/02; B01J 2219/0006
(Continued)

(56) References Cited

U.S. PATENT DOCUMENTS

| 4,750,556 A | 6/1988 | del Valle P. et al. |
| 2011/0172375 A1 | 7/2011 | Yeh et al. |

(Continued)

FOREIGN PATENT DOCUMENTS

| CN | 102781533 A | 11/2012 | |
| CN | 103539875 A * | 1/2014 | ................ C08F 2/12 |

(Continued)

OTHER PUBLICATIONS

Machine translation of Detailed Description of CN 103539875A; publication date: Jan. 29, 2014.*

(Continued)

*Primary Examiner* — Fred M Teskin

(57) ABSTRACT

A process for the preparation of polyethylene by polymerizing in a slurry ethylene and optionally one or more $C_3$ to $C_{10}$ alpha-olefins in a reactor system comprising a polymerization reactor and one or more first heat exchangers located outside the polymerization reactor where the slurry in the polymerization reactor is cooled by withdrawing slurry from the polymerization reactor, cooling the slurry in the one or more first heat exchangers and returning the cooled slurry to the polymerization reactor, wherein the one or more first heat exchangers are cooled by a first coolant having a temperature of 29° C. or higher.

24 Claims, 2 Drawing Sheets

(51) Int. Cl.
     *C08F 2/12*         (2006.01)
     *C08F 2/14*         (2006.01)
     *C08F 2/18*         (2006.01)
     *B01J 19/18*       (2006.01)

(58) Field of Classification Search
     USPC .......................................................... 526/68
     See application file for complete search history.

(56)                References Cited

U.S. PATENT DOCUMENTS

| | | |
|---|---|---|
| 2011/0172383 A1 | 7/2011 | Yeh et al. |
| 2012/0283396 A1 | 11/2012 | Meier et al. |
| 2013/0158213 A1 | 6/2013 | Meier et al. |
| 2015/0112038 A1 | 4/2015 | Strecker et al. |

FOREIGN PATENT DOCUMENTS

| | | | | |
|---|---|---|---|---|
| EP | 0608640 A1 | * | 8/1994 | ................ C08F 2/12 |
| WO | WO 2012/028591 A1 | | 3/2012 | |
| WO | WO-20130186299 A1 | | 12/2013 | |

OTHER PUBLICATIONS

PCT International Search Report & Written Opinion dated Aug. 19, 2015 for PCT/EP2015/063996.

* cited by examiner

ETHYLENE POLYMERIZATION PROCESS HAVING IMPROVED HEAT EXCHANGER PERFORMANCE

This application is the U.S. National Phase of PCT International Application PCT/EP2015/063996, filed Jun. 22, 2015, claiming benefit of priority to European Patent Application No. 14173958.1, filed Jun. 25, 2014, the disclosures of which are incorporated herein by reference in their entirety.

FIELD OF THE INVENTION

The present disclosure relates to ethylene polymerization processes having improved heat exchanger performance. More particularly, the present disclosure relates to ethylene slurry polymerization processes having improved heat exchanger performance through reduced wax fouling.

BACKGROUND OF THE INVENTION

Various processes can be used to produce polyethylene, including gas phase processes, solution processes, and slurry processes. In ethylene slurry polymerization processes, diluents such as hexane or isobutane may be used to dissolve the ethylene monomer, comonomers and hydrogen, and the monomer(s) are polymerized with a catalyst. Following polymerization, the polymer product formed is present as slurry of solid polyethylene particles suspended in the liquid medium. The individual length of the obtained polyethylene chains is not always identical but the produced molecules have a statistical distribution of their chain length, including extremely low molecular weight and oligomeric products. These undesired byproducts of the ethylene polymerization reactions, such as waxes, have a high solubility in the liquid phase and remain, at least partially, dissolved in the suspension medium.

In exemplary multi-reactor cascade processes, shown e.g., in WIPO Pat. App. Pub. No. WO 2005/077992 A1 or WIPO Pat. App. Pub. No. WO 2012/028591 A1, the reactors can be operated in parallel or in series, and the types and amounts of monomer and conditions can be varied in each reactor to produce a variety of polyethylene materials, including unimodal or multimodal polyethylene material. Such multimodal compositions are used in a variety of applications; e.g., WIPO Pat. App. Pub. No. WO 2012/069400 A1 discloses trimodal polyethylene compositions for blow moldings.

Slurry polymerization systems for ethylene can use external slurry coolers in a reactor recirculation loop to remove heat produced in the ethylene polymerization reactions. Caused by a reduced solubility at lower temperature, low molecular weight waxes, which may be produced in the reactors as a byproduct, can solidify when the slurry flows through the cooler and contacts the cold walls of the heat exchangers. This may foul the heat exchangers, i.e. may cause a build-up of a wax layer on the cold walls of the heat exchangers, decreasing the heat transfer in the heat exchanger and reducing their efficiency in heat removal.

Various methods have been disclosed for reducing heat exchanger fouling. One method involves the injection of various chemicals into the process stream; e.g. European Pat. App. No. EP 1645569 A1 discloses using a nonionic surfactant in a hydrocarbon-containing gas stream in a petrochemical or polyolefin production plant. Another method for reducing heat exchanger fouling involves the use of electrical/mechanical means. For example, WIPO Pat. App. Pub. No. WO 2004/094319 A1 discloses using a direct current electric potential on the wall of a pipe or duct. WIPO Pat. App. Pub. No. WO 2007/136697 A2 and WIPO Pat. App. Pub. No. WO 2008/002423 A2 disclose using mechanical vibrations in the heat exchanger. However for ethylene polymerization processes, injection of chemicals into the process stream could negatively affect polymer product properties, and using direct current or mechanical vibrations may not be practical.

Disclosed herein are ethylene-slurry-polymerization processes operating heat exchanger which have an improved heat removal performance.

SUMMARY OF THE INVENTION

The present disclosure provides processes for the preparation of polyethylene by polymerizing in a slurry ethylene and optionally one or more $C_3$ to $C_{10}$ alpha-olefins. The polymerization may occur at a temperature from 60° C. to 95° C. and a pressure from 0.15 MPa to 3 MPa in a reactor system. The reactor system may comprise a polymerization reactor and one or more first heat exchangers located outside the polymerization reactor. The slurry in the polymerization reactor may be cooled by withdrawing slurry from the polymerization reactor, cooling the slurry in the one or more first heat exchangers and returning the cooled slurry to the polymerization reactor. The one or more first heat exchangers may be cooled by a first coolant having a temperature of 29° C. or higher.

In some embodiments, the temperature in the polymerization reactor is maintained by adjusting the flow rate of the first coolant through the one or more first heat exchangers.

In some embodiments, the temperature of the first coolant fluctuates at the most in a range of 2° C.

In some embodiments, the first coolant has a temperature of from 29° C. to 40° C.

In some embodiments, the first heat exchangers are double pipe heat exchangers.

In some embodiments, the first coolant is circulated in a closed loop and cooled by a second heat exchanger which is cooled by a second coolant.

In some embodiments, the second heat exchanger is a plate heat exchanger.

In some embodiments, the temperature of the first coolant stream entering the first heat exchangers is maintained by adjusting the flow rate of the second coolant through the second heat exchanger.

In some embodiments, the polymerization reactor is further equipped at its outside with a cooling jacket and the first coolant is also cooling the cooling jacket of the polymerization reactor.

In some embodiments, the cooling jacket consists of a series of half-pipes attached to the outside of the polymerization reactor.

In some embodiments, the one or more first heat exchangers and the cooling jacket are operated in parallel in the closed loop of the circulating first coolant.

In some embodiments, the process for the preparation of polyethylene is carried out as multi-reactor polymerization in a combination of two, three or more reactor systems comprising each a polymerization reactor and one or more first heat exchangers located outside the polymerization reactor.

In some embodiments, the two, three or more polymerization reactors of the reactor system are operated in series.

In some embodiments, the first coolants of the respective first heat exchangers are circulated in one closed loop system and the respective first heat exchangers are operated in parallel in the closed loop of the circulating first coolant which is cooled by one second heat exchanger.

In some embodiments, the respective polymerization reactors are further equipped at their outside with a cooling jacket and the respective first heat exchangers and the respective cooling jackets are operated in parallel in the closed loop of the circulating first coolant.

DETAILED DESCRIPTION OF THE INVENTION

Polyethylene Slurry Production Process

Figure 1:
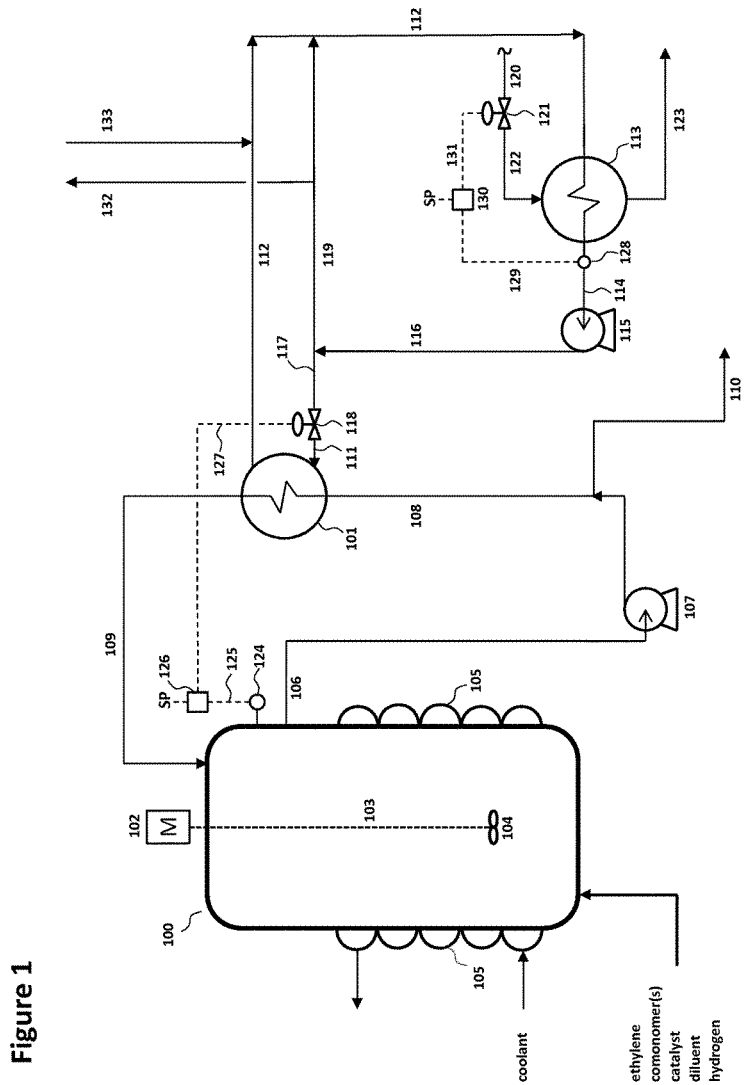
FIG. 1 is a flow diagram of an ethylene slurry polymerization process having a reaction system comprising a polymerization reactor and a heat exchanger located outside the polymerization reactor.

The process of the present disclosure for the preparation of polyethylene with improved heat removal performance includes the slurry polymerization of ethylene and optionally one or more $C_3$ to $C_{10}$ alpha-olefins as comonomers in the presence of an ethylene polymerization catalyst, a diluent, such as hexane or isobutane, and optionally hydrogen. The polymerization may proceed in a suspension of particulate polyethylene in a suspension medium comprising the diluent, unreacted ethylene and optionally one or more comonomers. Polyethylene polymers obtained by the process described in the present disclosure can be ethylene homopolymers or copolymers of ethylene containing up to 40 wt. %, or from 0.1 to 10 wt. % of recurring units derived from $C_3$-$C_{10}$-1-alkenes. The comonomers may be chosen from propylene, 1-butene, 1-pentene, 1-hexene, 1-octene or mixtures thereof. The slurry polymerization may occur at reactor temperatures from 60° C. to 95° C., or from 65° C. to 90° C., or from 70° C. to 85° C., and at reactor pressures from 0.15 MPa to 3 MPa, or from 0.2 MPa to 2 MPa, or from 0.25 MPa to 1.5 MPa.

Catalyst may be fed to the polymerization reactor, along with a diluent, aluminum alkyl, ethylene and optionally, co-monomers and hydrogen. These fed components may react to form a polyethylene product suspended in a slurry. The slurry may also contain diluent, unreacted ethylene and wax. In the polyethylene product, polymer may form around the catalyst particles as a result of the polymerization reactions, so that the catalyst becomes part of the polyethylene itself. The slurry polymerization may be conducted in a multi-reactor cascade where the reactors are operated in series, and the catalyst may remain active within the polymer as the polymer flows from reactor to reactor. In an embodiment of the present disclosure, the slurry polymerization is conducted in a three-reactor series. In this configuration, slurry from the first reactor in the series may flow to the second reactor, and slurry from the second reactor may flow to the third reactor.

The polyethylene polymers produced by the polymerization process may be high density polyethylene resins having a density in the range from 0.935 g/cm³ to 0.970 g/cm³. Alternatively, the density may be in the range from 0.940 g/cm³ to 0.970 g/cm³, or the density may be in the range from 0.945 g/cm³ to 0.965 g/cm³. Density may be measured according to DIN EN ISO 1183-1:2004, Method A (Immersion) with compression molded plaques of 2 mm thickness which were prepared with a defined thermal history: Pressed at 180° C., 20 MPa for 8 min with subsequent crystallization in boiling water for 30 min.

The polyethylene polymers produced by the polymerization process may have a melt index ($MI_{21.6}$) from 1 dg/min to 300 dg/min, or from 1.5 dg/min to 50 dg/min, or from 2 dg/min to 35 dg/min. The $MI_{21.6}$ may be measured according to DIN EN ISO 1133:2005, condition G at a temperature of 190° C. under a load of 21.6 kg.

Catalyst

The polymerization can be carried out using ethylene polymerization catalysts, e.g., Phillips catalysts based on chromium oxide, titanium-based Ziegler-type catalysts, i.e., Ziegler-catalysts or Ziegler-Natta-catalysts, or single-site catalysts. For the purposes of the present disclosure, single-site catalysts are catalysts based on chemically uniform transition metal coordination compounds. Single-site catalysts may be those comprising bulky sigma- or pi-bonded organic ligands, e.g. catalysts based on mono-Cp complexes, catalysts based on bis-Cp complexes, which can be designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are designated as hybrid catalysts. The preparation and use of these catalysts for olefin polymerization are generally known.

The catalysts may be of the Ziegler type, comprising a compound of titanium or vanadium, a compound of magnesium and optionally a particulate inorganic oxide as support.

The titanium compounds may be selected from the halides or alkoxides of trivalent or tetravalent titanium, with titanium alkoxy halogen compounds or mixtures of various titanium compounds. Examples of titanium compounds are $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ or $Ti(O\text{-}n\text{-}C_4H_9)_4$. In an embodiment of the preset disclosure, the titanium compounds may comprise chlorine as the halogen. In an embodiment, the titanium halides may comprise only halogen in addition to titanium or may be titanium chlorides or may be titanium tetrachloride. The vanadium compounds may be vanadium halides, vanadium oxyhalides, vanadium alkoxides or vanadium acetylacetonates. In an embodiment, the vanadium compounds are in the oxidation states 3 to 5.

In the production of the solid component, at least one compound of magnesium may be used. These compounds may be halogen-comprising magnesium compounds such as magnesium halides, and in particular the chlorides or bromides, or these compounds may be magnesium compounds from which the magnesium halides can be obtained in a customary way, e.g., by reaction with halogenating agents. In various embodiments of the present disclosure, the halogens are chlorine, bromine, iodine or fluorine, or mixtures of two or more of the halogens.

Possible halogen-containing magnesium compounds are magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. The halogenating agents may be, for example, halogens, hydrogen halides, $SiCl_4$ or $CCl_4$. In one embodiment, chlorine or hydrogen chloride is the halogenating agents.

Examples of halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxy-magnesium and diphenoxymagnesium. In one embodiment, the halogen-free compounds of magnesium are n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

The magnesium compounds for producing the particulate solids may be, apart from magnesium dichloride or magnesium dibromide, the di($C_1$-$C_{10}$-alkyl)magnesium compounds. In one embodiment, the Ziegler-type catalyst comprises a transition metal selected from titanium, zirconium, vanadium, and chromium.

The Ziegler-type catalyst may be added to the slurry reactor by first mixing the catalyst with the diluent used, such as hexane, in a mixing tank to form a slurry which may be pumped. A positive displacement pump, such as a membrane pump may be used to transfer the catalyst slurry to the slurry polymerization reactor.

Cocatalyst

Catalysts of the Ziegler type may be used for polymerization in the presence of a cocatalyst. Accordingly, the slurry polymerization of the present disclosure may be carried out in the presence of a cocatalyst. In an embodiment, cocatalysts are organometallic compounds of metals of groups 1, 2, 12, 13 or 14 of the Periodic Table of Elements, or organometallic compounds of metals of group 13 or organoaluminum compounds. The organoaluminum compounds may be selected from aluminum alkyls. The aluminum alkyls may be selected from trialkylaluminum compoundsor from trimethylaluminum (TMA), triethylaluminum (TEAL), tri-isobutylaluminum (TIBAL), or tri-n-hexylaluminum (TNHAL). In an embodiment of the present disclosure, the aluminum alkyl is TEAL. The cocatalyst(s) may be miscible with the diluent and thus comprised in the suspension medium.

The cocatalyst can be added to the slurry reactor as such. In an embodiment, the cocatalyst is added by first mixing the cocatalyst with the diluent used, such as hexane or isobutane, in a mixing tank. A positive displacement pump, such as a membrane pump may be used to transfer the cocatalyst to the slurry polymerization reactor.

Ethylene polymerization processes may produce as byproducts oligomers or extremely low molecular weight polymeric components. In slurry polymerization processes, these byproducts, such as waxes, are at least partially dissolved in the suspension medium. Such waxes are low molecular weight $C_{18}$-$C_{50}$ molecules and may be present in the slurry at levels of from 0.1 wt. % to 5.0 wt. %, based on the weight of the slurry.

Reactor System

The reactor system of the process of the present disclosure may support the slurry polymerization of ethylene and optionally one or more comonomers and comprises a polymerization reactor and one or more first heat exchangers located outside the polymerization reactor. The heat of polymerization may be removed from the reaction mixture by withdrawing slurry from the polymerization reactor, cooling the slurry in the one or more first heat exchangers and returning the cooled slurry to the polymerization reactor. It is possible that the reactor system has one first heat exchanger located outside the polymerization reactor. However, the reactor system may also have two, three, four or more first heat exchangers located outside the polymerization reactor. In an embodiment, the reactor system may have two or three first heat exchangers.

The process for the preparation of polyethylene may be carried out in at least one reactor system, which may have a polymerization reactor and a one or more first heat exchangers located outside the polymerization reactor. The polymerization process can however also be a multi-reactor polymerization carried out in a combination of two, three or more reactor systems. Then each polymerization reactor is part of an individual reactor system comprising a polymerization reactor and one or more first heat exchangers located outside the polymerization reactor. The process for the preparation of polyethylene according to the present disclosure may accordingly be a polymerization in a stand-alone polymerization system or it may be a multi-reactor polymerization in multiple reactor systems of a polymerization reactor and one or more first heat exchangers. Such multiple reactor systems may be operated in parallel or in series. It is possible to operate two, three or more reactor systems in parallel. In an embodiment, the reactor systems of the multi-reactor polymerization are operated in series; i.e. the reactor systems are arranged as cascade. Such series of reactor systems have a first polymerization reactor in a first reactor system and one, two or more subsequent polymerization reactors in subsequent reactor systems. Alternatively, the process for the preparation of polyethylene may be carried out in a series of three reactor systems having three polymerization reactors.

The presence of low molecular weight polymeric and oligomeric compounds such as waxes, which have a limited solubility in the suspension medium of the slurry, may influence the cooling performance of the heat exchangers. In order to cool the slurry, the surface temperature of the heat exchanger has to be lower than the temperature of the slurry entering the heat exchanger. Accordingly, the temperature of slurry in vicinity of the heat exchanger surface is lowered and part of the wax dissolved in the suspension medium may solidify. Solidifying wax can adhere to polyethylene particles contained in the slurry. Solidifying wax can however also adhere to the surface of the heat exchanger and may eventually form solid layers. Applicants believe that because the thermal conductivity of such solid layers is low, the heat transfer of the heat exchanger deteriorates and their efficiency in heat removal may be reduced. However, improving the efficiency of heat removal from the polymerization system by increasing the temperature difference between the temperature of the slurry entering the heat exchanger and the heat exchanger walls, i.e. by lowering the temperature of the coolant cooling the heat exchanger, might fail because a lowering of the coolant temperature may result in higher amounts of solidifying waxes and an increase of the thickness of the wall layer. Further parameters which may impact the build-up of a wall layer in the heat exchanger are the type of the catalyst/cocatalyst system being used and the nature and amount of comonomer because these factors influence the composition of waxes. Other impacting parameters may be the flow velocity of the slurry passing the heat exchanger and their particle concentration because a partly abrasion of the layer could occur. Of influence might further be the roughness of the inner walls of the heat exchanger because less fouling is observed on polished surfaces. In addition, also changes over time in already formed wall layers may influence the efficiency to the heat exchangers. Cross-linking of the wax could cause the average molecular weight to increase. Further, there might be traces of active catalysts present in a layer of solidified wax which could continue to form high-molecular polyethylene chains and so alter the nature of the layers.

If the layers in the heat exchanger have grown to a point that the heat transfer in the heat exchanger is unacceptable, it becomes unavoidable to clean them. For doing so, one heat exchanger may be isolated and a hot hydrocarbon like hexane, e.g. of about 155° C., may be circulated through the heat exchanger to re-dissolve the deposits. Such a procedure may take 2 or 3 days to complete, reducing the available throughput of the plant.

Applicants believe that by cooling the one or more first heat exchangers for cooling the slurry by a first coolant having a temperature of 29° C. or higher, the over-all performance of the heat removal from the polymerization can be improved. The temperature of the first coolant cooling the first heat exchangers may be from 29° C. to 40° C., or from 30° C. to 37° C.

The slurry in the polymerization reactor may be cooled for removing the heat of polymerization from the reactor. For producing polyethylene products with consistent quality, the temperature in the polymerization reactors may be controlled and maintained constant as long one polyethylene grade is produced under selected conditions. However, for compensating fluctuation in the polymerization process, the amount of heat removed per time may be varied to ensure a constant polymerization temperature. Variations in the amount of heat removed per time can in principle be achieved by two measures; it is possible to vary the temperature of the coolant cooling the heat exchanger or it is possible to change the flow rate of the coolant passing the heat exchanger. According to an embodiment of the present disclosure, the temperature in the polymerization reactor is maintained by adjusting the flow rate of the first coolant through the one or more first heat exchangers. Furthermore, changes in the desired production rate, or changes in the nature of the polymerization such as preparing different polyethylene grades, may also result in changes to the amount of heat removed per time (if such different polymerizations are carried out). The amount of heat removed per time from the polymerization reactor may be varied by varying the flow rate of the first coolant through the first heat exchangers for maintaining the reactor temperature for a specific polymerization. Alternatively, the amount of heat removed per time from the polymerization rector may be achieved by varying the flow rate of the first coolant through the first heat exchanger. Consequently, according to an embodiment of the present disclosure, for each individual heat exchanger, the temperature of the first coolant is kept essentially constant and fluctuates at the most in a range of 2° C. or fluctuates at the most in a range of 1° C. That means, for each individual heat exchanger, the temperature of the first coolant is 29° C. or higher, or from 29° C. to 40° C., or from 30° C. to 37° C. and varies only so little that the differences between any maximum temperature of the first coolant and any minimum temperatures of the first coolant is at the most 2° C. and or at the most 1° C. In an embodiment, respective heat exchangers of a reactor system are operated with the same first coolant temperature. When carrying out the process for the preparation of polyethylene as multi-reactor polymerization in a combination of two, three or more reactor systems, each of the reactor systems may be operated with the same first coolant temperature or each of the reactor systems has a temperature of the first coolant of 29° C. or higher but these first coolant temperatures differ although fluctuating at the most in a range of 2° C. In an embodiment, all reactor systems of a multi-reactor polymerization are operated with the same first coolant temperature.

Maintaining the temperature of the first coolant cooling the first heat exchangers in a very narrow interval may minimize the build-up of a wax layer at the walls of the heat-exchangers. Applicants presently believe that reducing the coolant temperature increases the thickness of the wax wall layer while an increase of the first coolant temperature does not result in a dissolution of wax once solidified unless the temperature of the first heat exchangers is raised to temperatures at which the wax starts to melt, i.e. to temperatures higher than the polymerization temperatures. Thus, operating ranges of the temperature of the first coolant may include 29° C. to 31° C., or 30° C. to 32° C., or 32° C. to 34° C., or 33° C. to 35° C., or 35° C. to 37° C. Having the temperature of the first coolant fluctuating at the most in a range of 2° C. may not only be ensured while controlling the temperature in the reactor of one specific polymerization but also for an extended period of time preparing different polyethylene grade and producing polyethylenes with different output of the plant.

The first coolant may be circulated in a closed loop and cooled by a second heat exchanger which is cooled by a second coolant which may be water. In an embodiment, all first heat exchangers of a reactor system are operated in parallel in one closed loop of the circulating first coolant. The second coolant may be provided through a second coolant feed line, passed through the second heat exchanger and may then be withdrawn through a second coolant exit line. The temperature of the circulated first coolant may be maintained by adjusting the flow rate of the second coolant through the second heat exchanger by means of a control valve located in the second coolant feed line.

The first coolant may be circulated by means of a first coolant cycle pump providing a substantially constant flow rate of the first coolant at the outlet of the cycle pump. The stream of the first coolant leaving the first coolant cycle pump may then be split into two portions. One portion may pass the one or more first heat exchangers for cooling the slurry while the second portion may bypass the first heat exchangers and directly return to the inlet side of the first coolant cycle pump. The flow rate of the first coolant through the one or more first heat exchangers may be adjusted by a control valve located in the line from the junction, in which the two portion of the first coolant are split, to the coolant inlet of the first heat exchanger when the reactor system has one first heat exchanger or in the line from the junction, in which the two portion of the first coolant are split, to the branching of the first coolant lines supplying the individual first heat exchangers when the reactor system has two or more first heat exchangers.

Varying the opening of the control valve may vary the ratio of the portion of the first coolant running through the one or more first heat exchangers to the portion bypassing the one or more first heat exchangers and accordingly the flow rate of the first coolant inlet through the one or more first heat exchangers. When carrying out the process for the preparation of polyethylene as multi-reactor polymerization in a combination of two, three or more reactor systems, all first heat exchangers may be circulated in one closed loop system and all first heat exchangers may be operated in parallel in the closed loop of the circulating first coolant which is cooled by one second heat exchanger.

According to an embodiment of the present disclosure, the slurry in the polymerization reactor is not only cooled in one or more first heat exchangers located outside the polymerization reactor but also by a cooling jacket on the outside of the polymerization reactor which cooling jacket is also cooled by the first coolant. The cooling jacket may consist of a series of half-pipes attached to the outside of the polymerization reactor. In an embodiment, the first heat exchangers and the cooling jacket on the outside of the polymerization reactor are operated in parallel in the closed loop of the circulating first coolant. When carrying out the process for the preparation of polyethylene as multi-reactor polymerization in a combination of two, three or more reactor systems, each of the reactor reactors may be equipped at its outside with a cooling jacket. In an embodiment, all first heat exchangers and all cooling jackets are operated in parallel in the closed loop of the circulating first coolant.

Heat Exchangers

The heat exchangers used in the process of the present disclosure can be any of those employed for the fluids described herein at the temperature and pressures involved, e.g., the heat exchangers can be selected from double pipe, shell & tube, plate, plate & shell and spiral heat exchangers. The first heat exchangers for cooling the slurry may be double pipe heat exchangers. The second heat exchanger for cooling the first coolant may be a plate heat exchanger. The flows of the streams to be cooled and the flows of the coolants may be co-current, counter-current or a combination of co-current/counter-current. In an embodiment, the flows in the heat exchangers are a combination of co-current/counter-current.

FIG. 1 illustrates an embodiment of the process of the present disclosure where polyethylene is prepared in a reactor system comprising a reactor 100 and one first heat exchanger 101.

Reactor 100 includes an agitator 102 for mixing the contents of the reactor. The agitator 102 comprises a motor (M), a rotating shaft 103, which is substantially vertically installed centrally into reactor 100, and at least one impeller 104. The reactor 100 further includes a cooling jacket 105 on the outside surface of the reactor 100. The cooling jacket may have a series of half-pipes attached to the outer surface of the reactor 100, through which a coolant (not shown) flows. The coolant liquid may be water. Slurry (not shown) is withdrawn from the reactor 100 through line 106 to pump 107, which then pumps the slurry through line 108 to first heat exchanger 101. Cooled slurry then flows through line 109 back to reactor 100. Slurry is further routed to a downstream reactor (not shown) or to product recovery through line 110.

The first coolant (not shown) for cooling first heat exchanger 101 comes through line 111, flows through heat exchanger 101 and exits heat exchanger 101 through line 112 and flows to second heat exchanger 113. The first coolant is cooled in second heat exchanger 113 and then flows through line 114 to coolant recycle pump 115 and is then pumped into line 116. A first portion of the first coolant flows through line 117 and control valve 118 to the first heat exchanger 101. The second portion of the first coolant flows through line 119 into line 112, and then to the second heat exchanger 113. The first coolant is cooled in the second heat exchanger 113 using a second coolant (not shown). The second coolant comes through line 120 to control valve 121 which adjusts the flow of the second coolant. The second coolant then flows through line 122 into second heat exchanger 113, through second heat exchanger 113, and then exits the second heat exchanger 113 through line 123.

To control the temperature of reactor 100, temperature transducer 124 produces temperature signal 125 which is representative of the temperature of reactor 100. Temperature controller 126 receives temperature signal 125 along with a setpoint (SP) which is representative of the desired temperature for reactor 100. In response to signal 125, temperature controller 126 provides output signal 127 which is responsive to the difference between signal 125 and the setpoint for the reactor temperature. Control valve 118 is manipulated in response to signal 127.

To control the temperature of the first coolant entering the first heat exchanger 101, temperature transducer 128 produces a temperature signal 129. The temperature signal 120 is representative of the temperature of the first coolant exiting heat exchanger 113 through line 114. Temperature controller 130 receives temperature signal 129 along with a setpoint (SP). The setpoint (SP) is representative of the desired temperature for the first coolant flowing in line 114. In response to temperature signal 129, temperature controller 130 provides output signal 131. The output signal 131 is responsive to the difference between signal 129 and the setpoint for the temperature of the first coolant flowing in line 114. Control valve 121 is manipulated in response to signal 131.

When operating the process for the preparation of polyethylene as a multi-reactor polymerization all first heat exchangers of such a two, three or more reactor systems may be cooled by one closed loop system of the first coolant which is cooled by one second heat exchanger 113. Then one or more lines 132 can branch off lines 116, 117 or 199 and provide first coolant to further first heat exchangers of further polymerization reactors (not shown in FIG. 1). After having passed the further first heat exchangers the first coolant is then routed back via one or more lines 133 into line 112.

Although not shown in FIG. 1, more than one first heat exchanger may be used to cool the slurry of reactor 100. Then slurry is withdrawn from reactor 100 through two or more lines 106 to two or more pumps 107, which then pump the slurry through two or more lines 108 to two or more first heat exchangers 101. Cooled slurry then flows through two or more lines 109 back to reactor 100. Slurry may further be routed from each of lines 108 through two or more lines 110 to a downstream reactor or to product recovery. It is however also possible that only one or some of lines 108 have a branching in a line 110 for routing slurry to a downstream reactor or to product recovery. The cooling of the one or more additional first heat exchangers 101 occurs by first coolant which is provided by lines which branch of line 111 after control valve 118.

Figure 2:
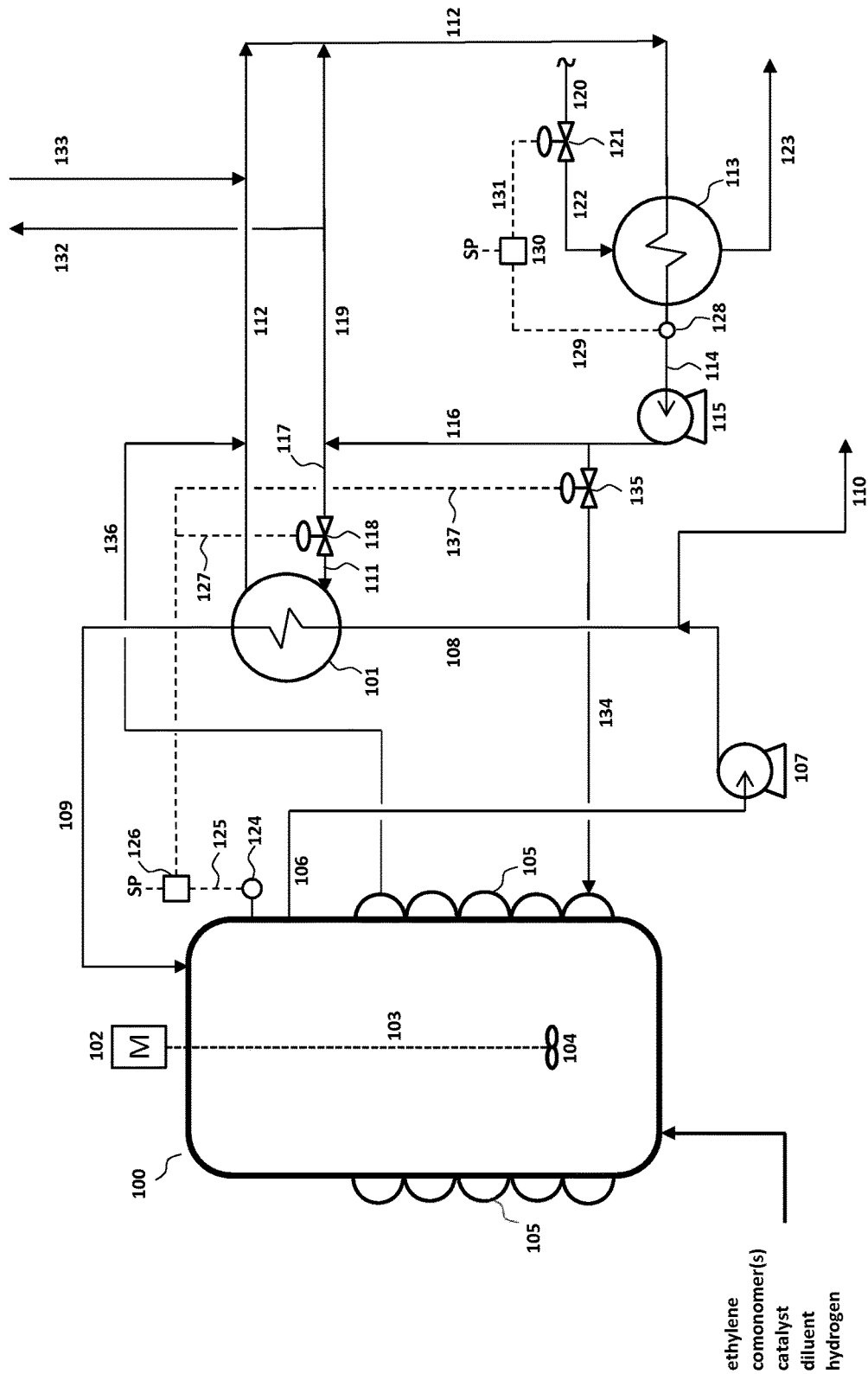
FIG. 2 is a flow diagram of an ethylene slurry polymerization process having a reaction system comprising a polymerization reactor and a heat exchanger located outside the polymerization reactor, where the coolant for cooling the heat exchanger is also cooling a cooling jacket attached to the polymerization reactor.

As shown in FIG. 2, it is also possible to route a portion of the first coolant exiting coolant recycle pump 115 via line 134 through control valve 135 in line 134 to the cooling jacket 105. After having passed cooling jacket 105, the first coolant flows through line 136 into line 112 and then to the second heat exchanger 113. Control valve 135 is manipulated in response to output signal 137 which control valve 135 receives from temperature controller 126. Output signal 137 is responsive to the difference between signal 125 and the setpoint for the reactor temperature.

One skilled in the art would recognize that the controllers could use any of established algorithms employed, such as proportional, proportional-integral, proportional-derivative, or proportional-integral-derivative.

EXAMPLES

The following Examples further details and explains the claimed ethylene polymerization process with improved heat exchanger performance.

Control Example A

Polyethylene was prepared in a commercially operated reactor system comprising three polymerization reactors where each of the polymerization reactors was equipped with two heat exchangers located outside the polymerization reactor for cooling the slurry by withdrawing slurry from the respective polymerization reactor, cooling the slurry in the corresponding two heat exchangers and returning the cooled slurry to the polymerization reactor. For a period of more than five years, polymerizations of ethylene and optionally 1-butene were carried out in the presence of Ziegler-type catalysts at reactor temperatures in the range of from 70° C. to 85° C. and reactor pressures of from 0.3 MPa to 1.3 MPa preparing a variety of different polyethylene grades. The heat exchangers were cooled with water as coolant. The temperatures of the coolant entering the heat exchangers were allowed to vary from 18° C. to 30° C. depending on the temperature of the available cooling water. On average, the heat exchangers were cleaned every six months to maintain a sufficient cooling capacity of the heat exchangers.

Example 1

Polyethylene was prepared in a commercially operated reactor system comprising three polymerization reactors where each of the polymerization reactors was equipped with two heat exchangers located outside the polymerization reactor for cooling the slurry by withdrawing slurry from the respective polymerization reactor, cooling the slurry in the corresponding two heat exchangers and returning the cooled slurry to the polymerization reactor. Polymerizations of ethylene and optionally 1-butene were carried out in the presence of Ziegler-type catalysts at reactor temperatures in the range of from 70° C. to 85° C. and reactor pressures of from 0.3 MPa to 1.3 MPa preparing a variety of different polyethylene grades. The heat exchangers were cooled with water as coolant. The water for cooling the heat exchangers for cooling the slurry was circulated as first coolant in one closed loop cooling all heat exchangers of the reactor system and being cooled by a second heat exchanger which was cooled by a second coolant. The temperatures of the first coolant entering the first heat exchanger for cooling the slurry were controlled and maintained in a temperature range from 29 to 31° C. The reactor system was operated for four years without needing a cleaning of the heat exchangers because no reduction in the cooling capacity of the heat exchangers was observed.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

What is claimed is:

1. A process for the preparation of polyethylene by polymerizing in a slurry ethylene and optionally one or more $C_3$ to $C_{10}$ alpha-olefins at a temperature from 60° C. to 95° C. and a pressure from 0.15 MPa to 3 MPa in a reactor system comprising a polymerization reactor and one or more first heat exchangers located outside the polymerization reactor, where the slurry in the polymerization reactor is cooled by withdrawing slurry from the polymerization reactor, cooling the slurry in the one or more first heat exchangers and returning the cooled slurry to the polymerization reactor, wherein the one or more first heat exchangers are cooled by a first coolant having a temperature of 29° C. or higher, and wherein the temperature in the polymerization reactor is maintained by adjusting the flow rate of the first coolant through the one or more first heat exchangers.

2. The process of claim 1, wherein the temperature of the first coolant fluctuates less than 2° C.

3. The process of claim 1, wherein the first coolant has a temperature of from 29° C. to 40° C.

4. The process of claim 1, wherein the first heat exchangers are double pipe heat exchangers.

5. The process of claim 1, wherein the first coolant is circulated in a closed loop and cooled by a second heat exchanger which is cooled by a second coolant.

6. The process of claim 5, wherein the second heat exchanger is a plate heat exchanger.

7. The process of claim 5, wherein the temperature of the first coolant stream entering the first heat exchangers is maintained by adjusting the flow rate of the second coolant through the second heat exchanger.

8. The process of claim 1, wherein the polymerization reactor is further equipped at its outside with a cooling jacket and the first coolant is also cooling the cooling jacket of the polymerization reactor.

9. The process of claim 8, wherein the cooling jacket consists of a series of half-pipes attached to the outside of the polymerization reactor.

10. The process of claim 8, wherein the one or more first heat exchangers and the cooling jacket are operated in parallel in the closed loop of the circulating first coolant.

11. The process of claim 1, wherein the process for the preparation of polyethylene is carried out as a multi-reactor polymerization process in a combination of two, three or more reactor systems each comprising a polymerization reactor and one or more first heat exchangers located outside the polymerization reactor.

12. The process of claim 11, wherein the two, three or more polymerization reactors of the reactor system are operated in series.

13. The process of claim 11, wherein the first coolants of the first heat exchangers are circulated in one closed loop system and the first heat exchangers are operated in parallel in the closed loop of the circulating first coolant which is cooled by a second heat exchanger.

14. The process of claim 13, wherein the polymerization reactors are further equipped at their outside with a cooling jacket and the first heat exchangers and the cooling jackets are operated in parallel in the closed loop of the circulating first coolant.

15. A process for the preparation of polyethylene by polymerizing in a slurry ethylene and optionally one or more $C_3$ to $C_{10}$ alpha-olefins at a temperature from 60° C. to 95° C. and a pressure from 0.15 MPa to 3 MPa in a combination of two, three or more reactor systems which are operated in series, where the reactor systems each comprise a polymerization reactor and one or more first heat exchangers located outside the polymerization reactor, where the slurry in the polymerization reactor is cooled by withdrawing slurry from the polymerization reactor, cooling the slurry in the one or more first heat exchangers and returning the cooled slurry to the polymerization reactor, and wherein the one or more first heat exchangers are cooled by a first coolant having a temperature of 29° C. or higher.

16. The process of claim 15, wherein the temperature in the polymerization reactor is maintained by adjusting the flow rate of the first coolant through the one or more first heat exchangers.

17. The process of claim 15, wherein the first coolant is circulated in a closed loop and cooled by a second heat exchanger which is cooled by a second coolant.

18. The process of claim 17, wherein the first coolants of all first heat exchangers are circulated in one closed loop system and all first heat exchangers are operated in parallel in the closed loop of the circulating first coolant which is cooled by one second heat exchanger.

19. The process of claim 18, wherein all polymerization reactors are further equipped at their outside with a cooling jacket and all first heat exchangers and all cooling jackets are operated in parallel in the closed loop of the circulating first coolant.

20. A process for the preparation of polyethylene by polymerizing in a slurry ethylene and optionally one or more $C_3$ to $C_{10}$ alpha-olefins at a temperature from 60° C. to 95° C. and a pressure from 0.15 MPa to 3 MPa in a reactor system comprising a polymerization reactor and one or more first heat exchangers located outside the polymerization reactor, where the slurry in the polymerization reactor is cooled by withdrawing slurry from the polymerization reactor, cooling the slurry in the one or more first heat exchangers and returning the cooled slurry to the polymerization reactor, wherein the one or more first heat exchangers are cooled by a first coolant having a temperature of 29° C. or higher, wherein the polymerization reactor is further equipped at its outside with a cooling jacket and the first coolant is also cooling the cooling jacket of the polymerization reactor.

21. The process of claim 20, wherein the first coolant is circulated in a closed loop and cooled by a second heat exchanger which is cooled by a second coolant.

22. The process of claim 20, wherein the process for the preparation of polyethylene is carried out as multi-reactor polymerization in a combination of two, three or more reactor systems each comprising a polymerization reactor and one or more first heat exchangers located outside the polymerization reactor.

23. The process of claim 22, wherein the first coolants of the first heat exchangers are circulated in one closed loop system and the first heat exchangers are operated in parallel in the closed loop of the circulating first coolant which is cooled by a second heat exchanger.

24. A process for the preparation of polyethylene by polymerizing in a slurry ethylene and optionally one or more $C_3$ to $C_{10}$ alpha-olefins at a temperature from 60° C. to 95° C. and a pressure from 0.15 MPa to 3 MPa in a reactor system comprising a polymerization reactor and one or more first heat exchangers located outside the polymerization reactor, where the slurry in the polymerization reactor is cooled by withdrawing slurry from the polymerization reactor, cooling the slurry in the one or more first heat exchangers and returning the cooled slurry to the polymerization reactor, wherein the one or more first heat exchangers are cooled by a first coolant having a temperature of from 29° C. to 40° C.

\* \* \* \* \*

UNITED STATES PATENT AND TRADEMARK OFFICE
CERTIFICATE OF CORRECTION

Page 1 of 1

PATENT NO. : 9,809,659 B2
APPLICATION NO. : 15/321152
DATED : November 7, 2017
INVENTOR(S) : Giuseppe Penzo et al.

It is certified that error appears in the above-identified patent and that said Letters Patent is hereby corrected as shown below:

In the Specification

Column 4    Line 9    Delete "$(MI_{216})$" and insert --$(MI_{21.6})$--
Column 5    Line 52   Delete "compoundsor" and insert --compounds or--

Signed and Sealed this
Twenty-fifth Day of February, 2020

Andrei Iancu
*Director of the United States Patent and Trademark Office*